United States Patent
Armstrong et al.

(10) Patent No.: US 9,452,475 B2
(45) Date of Patent: Sep. 27, 2016

(54) COATINGS FOR SOFC METALLIC INTERCONNECTS

(71) Applicant: Bloom Energy Corporation, Sunnyvale, CA (US)

(72) Inventors: Tad Armstrong, Burlingame, CA (US); James Wilson, San Francisco, CA (US); Harald Herchen, Los Altos, CA (US); Daniel Darga, Pleasanton, CA (US); Manoj Pillai, Sunnyvale, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 651 days.

(21) Appl. No.: 13/781,206

(22) Filed: Feb. 28, 2013

(65) Prior Publication Data

US 2013/0230644 A1 Sep. 5, 2013

Related U.S. Application Data

(60) Provisional application No. 61/605,309, filed on Mar. 1, 2012, provisional application No. 61/702,397, filed on Sep. 18, 2012.

(51) Int. Cl.
| | |
|---|---|
| *B22F 7/02* | (2006.01) |
| *H01M 8/02* | (2016.01) |
| *C23C 24/06* | (2006.01) |
| *C23C 4/02* | (2006.01) |
| *C23C 4/18* | (2006.01) |
| *C23C 24/08* | (2006.01) |
| *C23C 28/04* | (2006.01) |
| *H01M 8/12* | (2016.01) |

(52) U.S. Cl.
CPC . *B22F 7/02* (2013.01); *C23C 4/02* (2013.01); *C23C 4/11* (2016.01); *C23C 4/134* (2016.01); *C23C 4/18* (2013.01); *C23C 24/06* (2013.01); *C23C 24/082* (2013.01); *C23C 28/04* (2013.01); *H01M 8/0208* (2013.01); *H01M 8/0228* (2013.01); *H01M 8/0245* (2013.01); *H01M 2008/1293* (2013.01); *Y02E 60/50* (2013.01); *Y02E 60/525* (2013.01)

(58) Field of Classification Search
None
See application file for complete search history.

(56) References Cited

U.S. PATENT DOCUMENTS

| | | | |
|---|---|---|---|
| 4,135,041 | A | 1/1979 | Jung et al. |
| 4,755,429 | A | 7/1988 | Nickols et al. |

(Continued)

FOREIGN PATENT DOCUMENTS

| | | |
|---|---|---|
| CN | 1697229 A | 11/2005 |
| CN | 101438439 A | 5/2009 |

(Continued)

OTHER PUBLICATIONS

International Application No. PCT/US13/27895, International Filing Date: Feb. 27, 2013, "Coatings for SOFC Metallic Interconnects," Bloom Energy Corporation, Specification and drawings, 67pgs.

(Continued)

*Primary Examiner* — George Wyszomierski
*Assistant Examiner* — Ngoclan T Mai
(74) *Attorney, Agent, or Firm* — The Marbury Law Group PLLC

(57) ABSTRACT

Various methods of treating a chromium iron interconnect for a solid oxide fuel cell stack and coating the interconnect with a ceramic layer are provided.

13 Claims, 12 Drawing Sheets

(56) References Cited

U.S. PATENT DOCUMENTS

| | | |
|---|---|---|
| 4,913,982 A | 4/1990 | Kotchick et al. |
| 5,162,167 A | 11/1992 | Minh et al. |
| 5,213,910 A | 5/1993 | Yamada |
| 5,215,946 A | 6/1993 | Minh |
| 5,248,712 A | 9/1993 | Takeuchi et al. |
| 5,256,499 A | 10/1993 | Minh et al. |
| 5,273,837 A | 12/1993 | Aiken et al. |
| 5,290,642 A | 3/1994 | Minh et al. |
| 5,342,705 A | 8/1994 | Minh et al. |
| 5,368,667 A | 11/1994 | Minh et al. |
| 5,382,315 A | 1/1995 | Kumar |
| 5,453,331 A | 9/1995 | Bloom et al. |
| 5,494,700 A | 2/1996 | Anderson et al. |
| 5,501,914 A | 3/1996 | Satake et al. |
| 5,518,829 A | 5/1996 | Satake et al. |
| 5,589,017 A | 12/1996 | Minh |
| 5,641,585 A | 6/1997 | Lessing et al. |
| 5,733,499 A | 3/1998 | Takeuchi et al. |
| 5,942,349 A | 8/1999 | Badwal et al. |
| 5,955,392 A | 9/1999 | Takeuchi et al. |
| 6,001,761 A | 12/1999 | Hata et al. |
| 6,361,892 B1 | 3/2002 | Ruhl et al. |
| 6,492,053 B1 | 12/2002 | Donelson et al. |
| 6,582,845 B2 | 6/2003 | Helfinstine et al. |
| 6,589,681 B1 | 7/2003 | Yamanis |
| 6,638,575 B1 | 10/2003 | Chen et al. |
| 6,835,488 B2 | 12/2004 | Sasahara et al. |
| 7,045,237 B2 | 5/2006 | Sridhar et al. |
| 8,241,817 B2 | 8/2012 | Yang et al. |
| 8,663,869 B2 | 3/2014 | Janousek et al. |
| 2002/0012825 A1 | 1/2002 | Sasahara et al. |
| 2002/0132156 A1 | 9/2002 | Ruhl et al. |
| 2003/0170527 A1 | 9/2003 | Finn et al. |
| 2003/0175439 A1* | 9/2003 | Jacobson ............ H01M 8/1213 427/404 |
| 2003/0180602 A1 | 9/2003 | Finn |
| 2004/0101742 A1 | 5/2004 | Simpkins et al. |
| 2004/0200187 A1 | 10/2004 | Warrier et al. |
| 2005/0017055 A1 | 1/2005 | Kurz et al. |
| 2005/0084725 A1 | 4/2005 | Arthur et al. |
| 2005/0136312 A1 | 6/2005 | Bourgeois et al. |
| 2005/0220921 A1 | 10/2005 | Olsson |
| 2005/0227134 A1 | 10/2005 | Nguyen |
| 2005/0255355 A1 | 11/2005 | Ukai et al. |
| 2006/0192323 A1 | 8/2006 | Zobl et al. |
| 2006/0193971 A1 | 8/2006 | Tietz et al. |
| 2007/0134532 A1 | 6/2007 | Jacobson et al. |
| 2007/0190391 A1 | 8/2007 | Otschik et al. |
| 2007/0207375 A1 | 9/2007 | Jacobson et al. |
| 2007/0231676 A1 | 10/2007 | Cassidy et al. |
| 2008/0081223 A1 | 4/2008 | Yasumoto et al. |
| 2008/0199738 A1 | 8/2008 | Perry et al. |
| 2009/0004547 A1 | 1/2009 | Vitella et al. |
| 2009/0117441 A1 | 5/2009 | Suzuki et al. |
| 2009/0220833 A1 | 9/2009 | Jones |
| 2010/0015473 A1 | 1/2010 | Hendrikson et al. |
| 2010/0092328 A1 | 4/2010 | Thomas et al. |
| 2010/0119917 A1 | 5/2010 | Kumar et al. |
| 2010/0178589 A1 | 7/2010 | Kwon et al. |
| 2011/0135531 A1* | 6/2011 | Hsu ............................ B22F 3/24 419/26 |
| 2011/0143261 A1 | 6/2011 | Brandner et al. |
| 2011/0223510 A1 | 9/2011 | Greiner et al. |
| 2011/0287340 A1* | 11/2011 | Mougin ..................... C25B 9/00 429/514 |
| 2013/0130152 A1* | 5/2013 | Couse ................. H01M 8/0258 429/508 |
| 2013/0230644 A1 | 9/2013 | Armstrong et al. |
| 2013/0230792 A1 | 9/2013 | Wilson et al. |

FOREIGN PATENT DOCUMENTS

| | | |
|---|---|---|
| EP | 0615299 A1 | 9/1994 |
| EP | 1098380 A1 | 5/2001 |
| JP | 06-215778 | 8/1994 |
| JP | 09-199143 | 7/1997 |
| JP | 09-223506 | 8/1997 |
| JP | 09-245810 | 9/1997 |
| JP | 09-245811 | 9/1997 |
| JP | 09-277226 | 10/1997 |
| JP | 2000-281438 | 10/2000 |
| JP | 2010-113955 A | 5/2010 |
| TW | 201119771 A | 6/2011 |
| WO | WO2006/016628 A1 | 2/2006 |
| WO | WO 2011-096939 A1 | 8/2011 |
| WO | WO 2013-130515 A1 | 9/2013 |

OTHER PUBLICATIONS

U.S. Appl. No. 13/409,629, "Coatings for Metal Interconnects to Reduce SOFC Degradation," filed Mar. 1, 2012, James Wilson et al., Specification and drawings, 27pgs.

Gerardo Jose la O' et al., "Investigation of Oxygen Reduction Mechanisms Using Cathode Microelectrodes Part I: Experimental Analysis of $La_{1-x}Sr_xMnO_{3-d}$ and Platinum," 207th Meeting of the Electrochemical Society, Quebec City, Canada, May 15-20, 2005.

International Search Report and Written Opinion received in connection with international application No. PCT/US2013/027895; dated Jun. 24, 2013.

International Preliminary Report on Patentability received in connection with international application No. PCT/US2013/027895; dated Sep. 12, 2014.

J.W. Stevenson et al., "SECA Core Technology Program: Materials Development at PNNL," Pacific Northwest National Laboratory, Richland, WA, SECA Core Technology Review Meeting, Lakewood, CO, Oct. 25, 2005.

Seabaugh, M. et al., "Oxide Protective Coatings for Solid Oxide Fuel Cell Interconnects," ECS Trans., vol. 35, No. 1, 10 pages, (2011).

Saoutieff, et al., "APS Deposition of MnCo2o4 on Commercial Alloys K41X Used as Solid Oxide Fuel Cell Interconnect: The Importance of Post Heat-Treatment for Densification of the Protective Layer," ECS Transactions, vol. 25, No. 2, pp. 13907-1402, (2009).

Yang, et al., "(Mn, Co)3O4 Spinel Coatings on Ferritic Stainless Steels for SOFC Interconnect Applications," International Journal of Hydrogen Energy, vol. 32, pp. 3648-3654, (2007).

Garcia-Vargas, et al., "Use of SOFC Metallic Interconnect Coasted with Spinel Protective Layers Using the APS Technology," ECS Transactions, vol. 7, No. 1, pp. 2399-2405, (2007).

Non-Final Office Communication for U.S. Appl. 13/409,629, filed Mar. 1, 2012, dated Oct. 21, 2015, (44 pages).

Nagarathnam et al., Proc. of International Conference on Powder Metallurgy & Particulate Materials, Chicago, IL, Utron Inc., n.d. Web. Jul. 24, 2015.

J. Fergus, "Metallic Interconnects for Solid Oxide Fuel Cells," Materials Science and Engineering: A, vol. 397, Issues 1-2, Apr. 25, 2005, pp. 271-283, ISSN 0921-5093.

M. Seabaugh, ECS Trans., 35(1), 2471 (2011).

International Preliminary Report on Patentability, International Application No. PCT/US2012/065531, issued May 30, 2014.

International Preliminary Report on Patentability, International Application No. PCT/US2012/065508, issued May 30, 2014.

Haynes International High-Temperature Alloys, "HAYNES (Reg.) 214 (TM) alloy," 1996, pp. 1-19.

Haynes International High-Temperature Alloys, "HAYNES (Reg.) 230 (TM) alloy," 2004, pp. 1-27.

International Search Report and Written Opinion, International Application No. PCT/US2007/008224, issued Nov. 26, 2008, 10pgs.

International Search Report, International Application No. PCT/US2003/004808, issued Aug. 19, 2003, 9pgs.

Supplemental European Search Report, International Application No. PCT/US2003/004808, issued Jun. 2, 2008, 3pgs.

International Search Report and Written Opinion, International Application No. PCT/US2010/027899, issued Oct. 20, 2010, 11pgs.

(56) References Cited

OTHER PUBLICATIONS

International Preliminary Report on Patentability, International Application No. PCT/US2010/027899, issued Sep. 20, 2011, 6pgs.
International Search Report and Written Opinion, International Application No. PCT/US2012/065508, issued Mar. 29, 2013.
International Search Report and Written Opinion, International Application No. PCT/US2012/065531, issued Mar. 29, 2013.
Search Report for Taiwanese Application No. CN 102107116, dated Jun. 29, 2016, 2 pages.

* cited by examiner

COATINGS FOR SOFC METALLIC INTERCONNECTS

RELATED APPLICATIONS

This application claims the benefit of U.S. Provisional Application Ser. No. 61/605,309, filed Mar. 1, 2012 and U.S. Provisional Application Ser. No. 61/702,397, filed Sep. 18, 2012, both of which are hereby incorporated by reference in their entirety.

FIELD

The present invention is directed to fuel cell stack components, specifically to interconnects and methods of making interconnects for fuel cell stacks.

BACKGROUND

A typical solid oxide fuel cell stack includes multiple fuel cells separated by metallic interconnects (IC) which provide both electrical connection between adjacent cells in the stack and channels for delivery and removal of fuel and oxidant. The metallic interconnects are commonly composed of a Cr based alloy such as an alloy known as CrF which has a composition of 95 wt % Cr-5 wt % Fe or Cr—Fe—Y having a 94 wt % Cr-5 wt % Fe-1 wt % Y composition. The CrF and CrFeY alloys retain their strength and are dimensionally stable at typical solid oxide fuel cell (SOFC) operating conditions, e.g. 700-900 C in both air and wet fuel atmospheres. However, during operation of the SOFCs, chromium in the CrF or CrFeY alloys react with oxygen and form chromia, resulting in degradation of the SOFC stack.

Two of the major degradation mechanisms affecting SOFC stacks are directly linked to chromia formation of the metallic interconnect component: i) higher stack ohmic resistance due to the formation of native chromium oxide (chromia, $Cr_2O_3$) on the interconnect, and ii) chromium poisoning of the SOFC cathode.

Although $Cr_2O_3$ is an electronic conductor, the conductivity of this material at SOFC operating temperatures (700-900 C) is very low, with values on the order of 0.01 S/cm at 850 C (versus $7.9 \times 10^4$ $Scm^{-1}$ for Cr metal). The chromium oxide layer grows in thickness on the surfaces of the interconnect with time and thus the ohmic resistance of the interconnect and therefore of the SOFC stack due to this oxide layer increases with time.

The second degradation mechanism related to the chromia forming metallic interconnects is known as chromium poisoning of the cathode. At SOFC operating temperatures, chromium vapor diffuses through cracks or pores in the coating and chromium ions can diffuse through the lattice of the interconnect coating material into the SOFC cathode via solid state diffusion. Additionally, during fuel cell operation, ambient air (humid air) flows over the air (cathode) side of the interconnect and wet fuel flows over the fuel (anode) side of the interconnect. At SOFC operating temperatures and in the presence of humid air (cathode side), chromium on the surface of the $Cr_2O_3$ layer on the interconnect reacts with water and evaporates in the form of the gaseous species chromium oxide hydroxide, $CrO_2(OH)_2$. The chromium oxide hydroxide species transports in vapor form from the interconnect surface to the cathode electrode of the fuel cell where it may deposit in the solid form, $Cr_2O_3$. The $Cr_2O_3$ deposits on and in (e.g., via grain boundary diffusion) the SOFC cathodes and/or reacts with the cathode (e.g. to form a Cr—Mn spinel), resulting in significant performance degradation of the cathode electrode. Typical SOFC cathode materials, such as perovskite materials, (e.g., LSM, LSC, LSCF, and LSF) are particularly vulnerable to chromium oxide degradation.

SUMMARY

An embodiment relates to a coated interconnect for a solid oxide fuel cell including an interconnect substrate comprising iron and chromium and a manganese cobalt oxide spinel coating formed over an air side of the interconnect substrate and a method of making and treating thereof. The manganese cobalt oxide spinel coating comprises a composition in the $(Mn,Co)_3O_4$ family between the end compositions of $Co_3O_4$ and $Mn_3O_4$.

Another embodiment relates to a method of making an interconnect for a solid oxide fuel cell including forming a manganese cobalt oxide spinel coating on an air side of the interconnect except in at least one seal region on the air side of the interconnect.

Another embodiment relates to a method of making an interconnect for a solid oxide fuel cell including coating an air side of a Cr—Fe interconnect with a ceramic layer to form a native chromium oxide layer on a fuel side of the interconnect, depositing a nickel containing material on the native chromium oxide layer and diffusing the nickel into the native chromium oxide layer to form a nickel metal-chromium oxide composite layer.

Another embodiment relates to a method of making an interconnect for a solid oxide fuel cell including coating an air side of the interconnect with a ceramic layer to form a native chromium oxide on a fuel side of the interconnect and annealing the interconnect at a temperature of at least 900 C in an atmosphere having a partial pressure of oxygen between $10^{-16}$ and $10^{-24}$ atm to reduce or eliminate the native chromium oxide layer.

Another embodiment relates to a method of making an interconnect for a solid oxide fuel cell including providing a interconnect comprising a pressed green mixture of Cr and Fe powder, coating an air side of an interconnect with a layer of material comprising ceramic powder and sintering the green mixture of Cr and Fe powder and the layer of ceramic powder in the same sintering step.

Another embodiment relates to a method of making an interconnect for a solid oxide fuel cell including providing an interconnect comprising Cr and Fe, coating the interconnect with manganese cobalt oxide precursors comprising one or more of MnO, CoO, Mn metal, Co metal and combinations thereof and sintering the manganese cobalt oxide precursors to form a manganese cobalt oxide spinel coating.

Another embodiment relates to a coated interconnect for a solid oxide fuel cell including an interconnect substrate comprising iron and chromium and a manganese cobalt oxide spinel coating formed over an air side of the interconnect substrate. The manganese cobalt oxide spinel coating comprises a composition in a $(Mn,Co)_3O_4$ family between the end compositions of $Co_3O_4$ and $Mn_3O_4$, wherein an atomic ratio of Mn:Co≥5:1.

Another embodiment relates to a coated interconnect for a solid oxide fuel cell including an interconnect substrate comprising iron and chromium and a manganese cobalt oxide spinel coating formed over an air side of the interconnect substrate. The manganese cobalt oxide spinel coating further comprises at least one of iron, titanium, vanadium, chromium, aluminum, manganese, calcium, silicon and/or cerium.

Another embodiment relates to a coated interconnect for a solid oxide fuel cell including an interconnect substrate comprising iron and chromium, a manganese cobalt oxide spinel coating formed over an air side of the interconnect substrate and a barrier layer between the interconnect substrate and the manganese cobalt oxide spinel coating.

Another embodiment relates to a method of making a coated interconnect for a solid oxide fuel cell including forming a reactive layer and a manganese cobalt oxide spinel layer over the interconnect and diffusing the dopant from the reactive layer into the manganese cobalt oxide spinel layer.

Another embodiment relates to a method of making a coated interconnect for a solid oxide fuel cell including forming an interconnect comprising Fe, Cr and a dopant, coating the interconnect with a manganese cobalt oxide spinel layer and diffusing dopant from the interconnect into the manganese cobalt oxide spinel layer.

Another embodiment relates to a method of making a coated interconnect for a solid oxide fuel cell including providing an interconnect comprising a chromium iron alloy, removing a first native chromium oxide from an air side but not a fuel side of the interconnect, coating the air side of the interconnect with a manganese cobalt oxide spinel layer and forming a second native chromium oxide on the fuel side of the interconnect, and removing the second native oxide from the fuel side of the interconnect.

Another embodiment relates to a method of making an interconnect for a solid oxide fuel cell including providing an interconnect comprising Cr and Fe and coating the interconnect with a ceramic layer with an air plasma spray process. The ceramic layer includes a sintering aid.

Another embodiment relates to a method of making an interconnect for a solid oxide fuel cell stack including providing first metallic powder particles comprising Cr and Fe in a mold cavity, providing second powder particles comprising one or more of Sr, La, Mn and Co oxides in the mold cavity and compacting the first and second powder particles to form the interconnect.

Another embodiment relates to a coated interconnect for a solid oxide fuel cell including an interconnect substrate comprising iron and chromium, a manganese cobalt oxide spinel coating formed over an air side of the interconnect substrate, wherein the manganese cobalt oxide spinel coating further comprises at least one or nickel and copper, a manganese and chromium containing oxide intermediate spinel layer located between the manganese cobalt oxide spinel coating and the air side of the interconnect substrate and a perovskite layer located over the manganese cobalt oxide spinel coating.

DETAILED DESCRIPTION

To limit the diffusion of chromium ions (e.g., $Cr^{3+}$) through the interconnect coating material to the SOFC cathode, materials may be selected that have few cation vacancies and thus low chromium diffusivity. A series of materials that have low cation diffusivity are in the perovskite family, such as lanthanum strontium oxide, e.g. $La_{1-x}Sr_xMnO_3$ (LSM), where $0.1 \leq x \leq 0.3$, such as $0.1 \leq x \leq 0.2$. These materials have been used as interconnect coating materials. In the case of LSM, the material has high electronic conductivity yet low anion and cation diffusion.

A second role of the interconnect coating is to suppress the formation of the native oxide on the interconnect surface. The native oxide is formed when oxygen reacts with chromium in the interconnect alloy to form a relatively high resistance layer of $Cr_2O_3$. If the interconnect coating can suppress the transport of oxygen and water vapor from the air to the surface of the interconnect, then the kinetics of oxide growth can be reduced.

Similar to chromium, oxygen (e.g., $O^{2-}$ ions) can transport through the coating via solid state diffusion or by gas transport through pores and cracks in the coating. This mechanism is also available for airborne water vapor, an accelerant for Cr evaporation and possibly oxide growth. As discussed above, in a humid air environment, chromium evaporates from the surface of $Cr_2O_3$ in the form of the gas molecule $CrO_2(OH)_2$ that can subsequently diffuse through defects, such as pore and cracks, in the coating(s). In the case of oxygen and water vapor, the molecules diffuse through the defects by either bulk diffusion or by a Knudsen diffusion process, depending on the size of the defect or pore.

Figure 1:
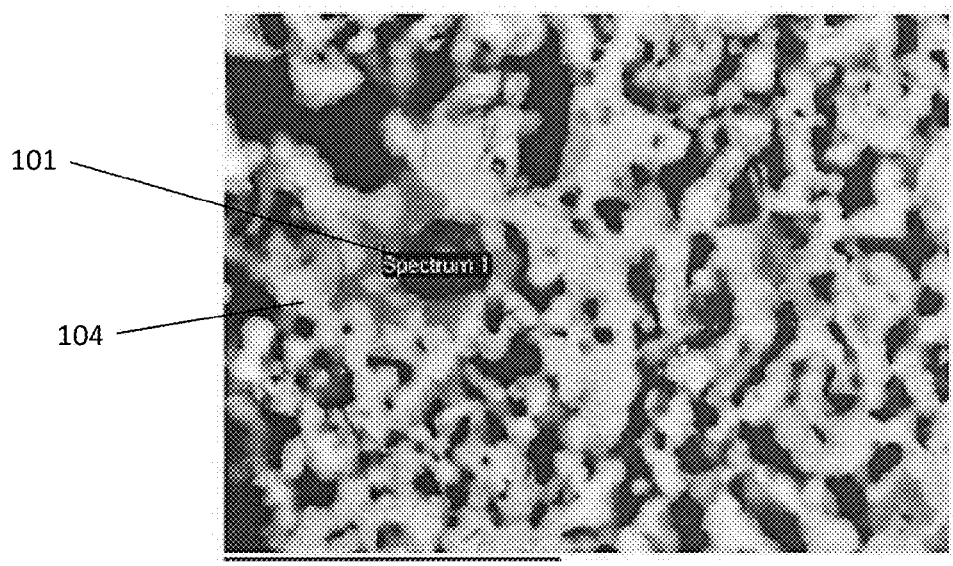
FIG. 1 is a micrograph showing a Mn—Cr spinel phase inside the pores of an LSM based cathode.
Figure 2:
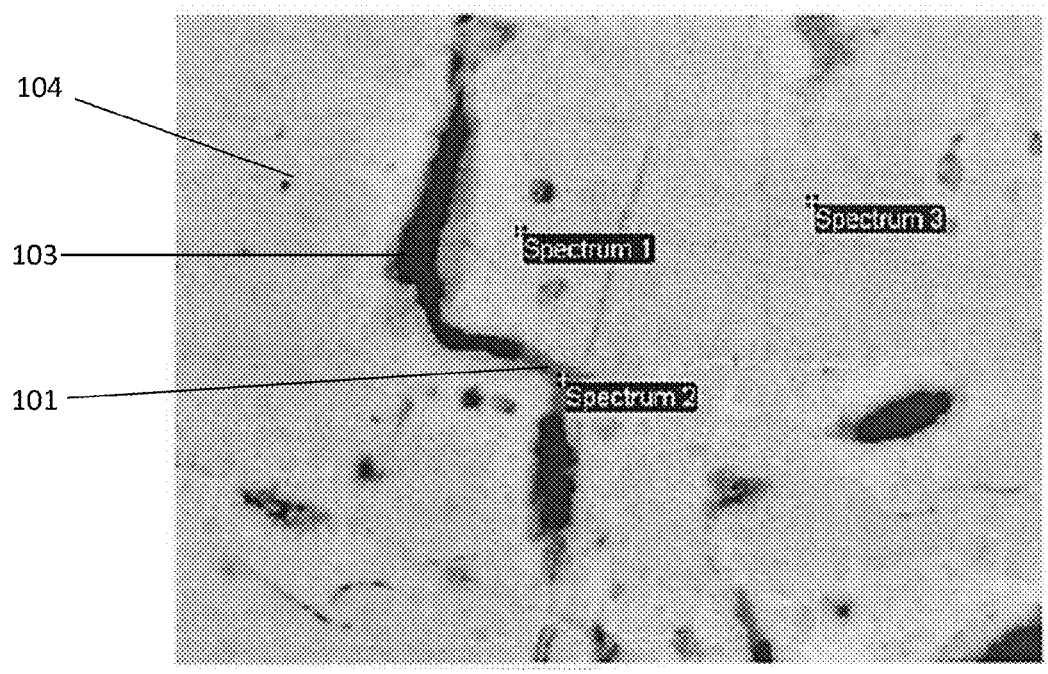
FIG. 2 is a micrograph showing a Cr containing phase in the cracks of an LSM interconnect coating that was deposited by air plasma spray. The SOFC stack was operated for 2000 hrs at 850 C.

If a $CrO_2(OH)_2$ molecule touches the coating surface, it may react to form a crystal and then re-evaporates to continue diffusing in the gas stream (in the crack or pore). Experiments have shown that $CrO_2(OH)_2$ reacts with the LSM interconnect coating 104 to form a spinel phase 101, e.g. manganese chromium oxide $(Mn, Cr)_3O_4$ as shown in FIG. 1. Although $CrO_2(OH)_2$ reacts with LSM to form the spinel phase, the chromium species is not prohibited from re-evaporating and diffusing farther down the crack or defect. Chromium has been observed transporting along the lengths of cracks in LSM IC coatings that have operated in fuel cells for extended periods of time. FIG. 2 shows chromium crystals 101 in cracks 103 in an LSM IC coating 104 that was operated in an SOFC stack for 2000 hrs under normal conditions of 800-850 C with ambient air on the cathode side. The chromium-containing crystal formations are characteristic of those formed from a vapor-to-solid phase transformation. SEM and EDS analysis of the bulk LSM coating away from the cracks do not show the presence of chromium. Therefore, it may be concluded that the majority of chromium transport from the CrF interconnect is through the LSM IC coating is via gas phase transport through and along micro- and macro-cracks, inter-particle spaces, and porosity in the LSM coating.

In the case of solid state transport, materials are chosen that have few oxide ion vacancies and thus low oxide ion conductivity. For example, the perovskite LSM is unique in that it exhibits both low cation and anion conductivity yet possesses high electronic conductivity, making it a very good coating material. Other perovskites such as $La_{1-x}Sr_xFeO_{3-d}$, $La_{1-x}Sr_xCoO_{3-d}$, and $La_{1-x}Sr_xCo_{1-y}Fe_yO_{3-d}$ all exhibit high electronic conduction and low cation conduction (low chromium diffusion rates). However, these particular materials also exhibit high oxide ion conductivities and thus are less effective at protecting the interconnect from oxidation (oxide growth).

A second material family that can be used for interconnect coating are the manganese cobalt oxide (MCO) spinel materials. In an embodiment, the MCO spinel encompasses the compositional range from $Mn_2CoO_4$ to $Co_2MnO_4$. That is, any spinel having the composition $Mn_{2-x}Co_{1+x}O_4$ ($0 \leq x \leq 1$) or written as $z(Mn_3O_4)+(1-z)(Co_3O_4)$, where ($\frac{1}{3} \leq z \leq \frac{2}{3}$) or written as $(Mn, Co)_3O_4$ may be used, such as $Mn_{1.5}Co_{1.5}O_4$, $MnCo_2O_4$ or $Mn_2CoO_4$. Many of the spinels that contain transition metals exhibit good electronic conductivities and reasonably low anion and cation diffusivities and are therefore suitable coating materials.

In an embodiment, the spinel, e.g. $(Mn, Co)_3O_4$, powder is doped with Cu to reduce the melting temperature of the spinel. The lowered melting temperature improves (increases) the coating density upon deposition with a coating method, such as air plasma spray (APS) and increases the conductivity of reaction zone oxide. The improvement in the density of the coating due to the lower melting temperature can occur during APS deposition and during operation at SOFC temperature for extended periods of time.

The addition of Cu to the spinel layer has an additional advantage. The Cu doping of the spinel, such as (Mn, Co)$_3$O$_4$, may result in higher electrical conductivity of the base spinel phase as well as any reaction zone oxides that form between the spinel and the native $Cr_2O_3$ oxide. Examples of electrical conductivities of oxides from the $(Mn, Co, Cu, Cr)_3O_4$ family include: $CuCr_2O_4$: 0.4 S/cm at 800 C, $Cu_{1.3}Mn_{1.7}O_4$: 225 S/cm at 750 C, and $CuMn_2O_4$: 40 S/cm at 800 C.

The spinel family of materials has the general formula $AB_2O_4$. These materials may form an octahedral or cubic crystal structure depending on the elements occupying the A and B sites. Further, depending on the doping conditions, the copper atoms may occupy either the A site, the B site or a combination of the A and B sites. Generally, Cu prefers to go into B site. When the A element is Mn, the B element is Co, and the spinel is doped with Cu, the spinel family may be described with the general formula $(Mn, Co, Cu)_3O_4$. More specifically, the spinel family may be described with the following formulas depending on location of the Cu alloying element:

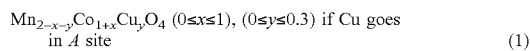

$Mn_{2-x-y}Co_{1+x}Cu_yO_4$ ($0 \leq x \leq 1$), ($0 \leq y \leq 0.3$) if Cu goes in A site (1)

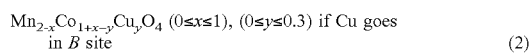

$Mn_{2-x}Co_{1+x-y}Cu_yO_4$ ($0 \leq x \leq 1$), ($0 \leq y \leq 0.3$) if Cu goes in B site (2)

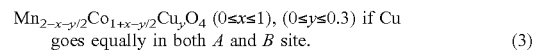

$Mn_{2-x-y/2}Co_{1+x-y/2}Cu_yO_4$ ($0 \leq x \leq 1$), ($0 \leq y \leq 0.3$) if Cu goes equally in both A and B site. (3)

Specific $(Mn, Co, Cu)_3O_4$ compositions include, but are not limited to, $Mn_{1.5}Co_{1.2}Cu_{0.3}O_4$, $Mn_{1.5}Co_{1.4}Cu_{0.1}O_4$; $Mn_2Co_{0.8}Cu_{0.2}O_4$ and $Co_2Mn_{0.8}Cu_{0.2}O_4$. Additional compositions include $Mn_2Co_{1-y}Cu_yO_4$, where ($0 \leq y \leq 0.3$), if Cu goes in B site. These composition may also be written, $(Mn_2O_3)+(1-z)(CoO)+z(CuO)$, where ($0 \leq z \leq 0.3$). Other compositions include $Co_2Mn_{1-y}Cu_yO_4$ where ($0 \leq y \leq 0.3$) if Cu goes in B site. These composition may also be written, $(Co_2O_3)+(1-z)(MnO)+z(CuO)$ where ($0 \leq z \leq 0.3$). In one preferred Mn, Co spinel composition, the Mn/Co ratio is 1.5/1.5, e.g. $Mn_{1.5}Co_{1.5}O_4$. When B site doped with Cu, preferred compositions include $Mn_{1.5}Co_{1.5-y}Cu_yO_4$, where ($0 \leq y \leq 0.3$).

In another embodiment, $(Mn, Co)_3O_4$ or $(Mn, Co, Cu)_3O_4$ spinel families are doped with one or more single valence species. That is, one or more species that only have one valence state. Doping with single valence species reduces cation transport at high temperature and thus reduces the thickness of the intermediate oxide layer 106. The primary ionic transport mechanism in spinels is through cation diffusion via cation vacancies in the lattice structure. In spinels with multivalent species $M^{2+/3+}$, such as $Mn^{3+/4+}$ and $Co^{2+/3+}$, cation vacancies are generated when M species are oxidized from lower to higher valence states to maintain local charge neutrality. The introduction of a single valence species typically decreases the amount of cation vacancies and decreases the amount of interdiffusion between the spinel coating 102 and the native $Cr_2O_3$ oxide or the CrF substrate 100. In this manner, the amount of the intermediate oxide layer 106 that forms is decreased. Examples of single valence species that may be introduced into the spinel coating include $Y^{3+}$, $Al^{3+}$, $Mg^{2+}$ and/or $Zn^{2+}$ metals. In an aspect, the spinel coating has a composition of $(Mn, Co, M)_3O_4$, where M=Y, Al, Mg, or Zn. For example, if M=Al doped in the A position, then the spinel compositions may include $Mn_{2-y}Al_yCoO_4$ ($0 \leq y \leq 0.3$) or $(1-z)(Mn_2O_3)+z(Al_2O_3)+CoO$, where ($0 \leq z \leq 0.15$).

In an embodiment, the interconnect coating is deposited on the Cr based alloy interconnect, such as an IC containing 93-97 wt % Cr and 3-7 wt % Fe, such as the above described Cr—Fe—Y or CrF interconnects with an air plasma spray (APS) process. The air plasma spray process is a thermal spray process in which powdered coating materials are fed into the coating apparatus. The coating particles are introduced into a plasma jet in which they are melted and then accelerated toward the substrate. On reaching the substrate, the molten droplets flatten and cool, forming the coating. The plasma may be generated by either direct current (DC plasma) or by induction (RF plasma). Further, unlike controlled atmosphere plasma spraying (CAPS) which requires an inert gas or vacuum, air plasma spraying is performed in ambient air.

Cracks in the coatings can arise at two distinct times, a) during deposition, and b) during operation in SOFC conditions. Cracks formed during deposition are influenced by both the spray gun parameters and the material's properties of the coating material. The cracks that form during operation are largely a function of the material's properties and more specially the density and sinterability of the material. Without being bound by a particular theory, it is believed that the cracking that occurs during operation is the result of continuing sintering of the coating and therefore increased densification of the coating with time. As the coatings densify, they shrink laterally. However, the coatings are constrained by the substrate and thus cracks form to relieve stress. A coating that is applied with a lower density is more likely to densify further during operation, leading to crack formation. In contrast, a coating that is applied with a higher density, is less likely to form cracks.

In a first embodiment, a sintering aid is added to the IC coating to reduce crack formation and thus decrease chromium evaporation. The sintering aid is a material which increases the as-deposited coating density and/or decreases the densification after coating deposition. Since the sintering aid increases the as-deposited density of the coating materials, it thereby reduces crack formation that occurs after the coating formation due to subsequent densification and/or operating stress on a relatively porous material. Suitable sintering aids include materials that either a) lower the melting temperature of the bulk phase of the coating materials, b) melt at a lower temperature than the bulk phase resulting in liquid phase sintering, or c) form secondary phases with lower melting temperatures. For the perovskite family, including LSM, sintering aids include Fe, Co, Ni, and Cu. These transition metals are soluble in LSM and readily dope the B-site in the $ABO_3$ perovskite phase. The melting temperature of oxides in the 3d transition metals tend to decrease in the order Fe>Co>Ni>Cu. The addition of these elements to the B-site of LSM will lower the melting temperature and improve the as-sprayed density. In an embodiment, one or more of Fe, Co, Ni and Cu are added to the coating such that the coating comprises 0.5 wt % to 5 wt %, such as 1% to 4%, such as 2% to 3% of these metals. In an alternative embodiment, the coating composition is expressed in atomic percent and comprises $La_{1-x}Sr_xMn_{1-y}M_yO_{3-d}$ where (M=Fe, Co, Ni, and/or Cu), $0.1 \leq x \leq 0.3$, $0.005 \leq y \leq 0.05$ and $0 \leq d \leq 0.3$. It should be noted that the atomic percent ranges of the Fe, Co, Ni and Cu do not necessarily have to match the weigh percent ranges of these elements from the prior embodiment.

Other elements can also be added in combination with the above transition metals to maximize conductivity, stability, and sinterability. These elements include, but are not limited to, Ba, Bi, B, Cu or any combination thereof (e.g. Cu+Ba combination), such as in a range of 5 wt % or less, such as 0.5-5 wt %. Additionally, sintering aids that specifically dope the A-site of LSM, such as Y, may be added for similar effect. An example according to this embodiment is $La_yY_xSr_{1-x-y}MnO_3$, where x=0.05-0.5, y=0.2-0.5, such as $La_{0.4}Y_{0.1}Sr_{0.5}MnO_3$. For coating materials other than LSM, copper may be used as the sintering aid in the above described MCO spinel material.

In another embodiment, rather than introducing a transition metal powder into the air plasma spray during deposition, a metal oxide powder that is easily reduced in the APS atmosphere to its metal state is added to the plasma. Preferably, the metal of the metal oxide exhibits a melting temperature lower than that of the coating phase (perovskite or spinel phase). For example, the binary oxides cobalt oxide (e.g., $CoO$, $Co_3O_4$, or $Co_2O_3$), $NiO$, $In_2O_3$, $SnO$, $B_2O_3$, copper oxide (e.g., $CuO$ or $Cu_2O$), $BaO$, $Bi_2O_3$, $ZnO$ or any combination thereof (e.g., $(Cu,Ba)O$) may be added as a second phase to the coating powder (i.e. LSM powder or La+Sr+Mn powders or their oxides). This addition, results in a two-phase powder mixture that is fed to the gun. The amount of second phase could be less than or equal to 5 wt %, such as in the range from 0.1 wt % to 5 wt % of the total powder weight.

In the APS gun, the metal oxide is reduced to its metal phase, melts, and promotes sintering of the melted LSM particles as the LSM particles solidify on the surface of the IC. The lower melting temperature of the metals and binary oxides promotes densification during deposition and solidification.

In another embodiment, a material that reacts with the coating material (such as LSM) and forms a secondary phase with a lower melting temperature is added to the coating feed during the APS process. The lower melting temperature secondary phase promotes densification. For example, silicate and/or calcium aluminate powders may react with the coating material powder(s) in the hot plasma portion of the APS gun to form glassy phases. In an embodiment, La from the LSM material reacts with a Si—Ca—Al oxide (which may also include K or Na) to form a glassy phase such as La—Ca—Si—Al oxide that forms between LSM particles. The coating may include less than or equal to 5 wt %, such as 0.5-5% of silicate, Ca—Al oxide or Si—Ca Al oxide.

In a second embodiment, the coating is post-treated in such a manner as to cause stress-free densification. This post-treatment may be performed in combination with or without the addition of the sintering aids of the first embodiment. In an example post-treatment according to the second embodiment, "redox" cycling in $N_2$ and $O_2$ atmospheres is performed. In this cycling, the coating is alternatively exposed to neutral and oxidizing atmospheres. For example, the coating may be treated in a neutral atmosphere comprising nitrogen or a noble gas (e.g., argon) and then treated in an oxidizing atmosphere comprising oxygen, water vapor, air, etc. One or more cycles may be performed, such 2, 3, 4, or more as desired. If desired, a reducing (e.g., hydrogen) atmosphere may be used instead of or in addition to the neutral atmosphere. Redox cycling in $N_2$ and $O_2$ atmospheres may cause cation vacancy concentration gradients that increase the diffusion of cation vacancies and thereby effectively increase sintering rates. This effect can be further increased by using a lower Sr content LSM coating of $La_{1-x}Sr_xMnO_{3-d}$ where $x \leq 0.1$, e.g., $0.01 \leq x \leq 0.1$, $d \leq 0.3$, such that the oxygen non-stoichiometry is maximized. Use of this sintering procedure may enhance any or all of the sintering aid techniques described above.

In a third embodiment, the surface area for electrical interaction between the coating and the underlying Cr—Fe IC surface is enlarged. The chromia layer that forms between the coating and the IC causes millivolt drops over time as the chromia layer grows in thickness. The total voltage drop is dependent on the area and thickness over which the voltage drop occurs. Increasing the area of the oxide growth between the IC and the coating lowers the impact on voltage losses, thereby increasing the life of the stack. By adding what would be depth penetrations of the coating, this embodiment effectively increases the surface area of contact and thereby reduces the impact of the growing chromia layer.

A method according to this third embodiment includes embedding small quantities of coating materials into the IC. There are two alternatives aspects of this embodiment. One aspect includes fully and uniformly distributing the coating material, such as LSM or MCO, within the IC powder (e.g., Cr—Fe powder) before compacting to form the IC. The coating powder (e.g., LSM and/or MCO powder) could be included when mixing the lubricant and Fe, Cr (or Cr—Fe alloy) powders together before compaction. Preferably, the powder mixture is able to withstand sintering temperatures and a reducing environment. The second aspect includes incorporating (e.g., embedding) a predetermined amount of coating powder only in the top surface of the Cr alloy IC. The oxide regions embedded in the surface of the CrF or CrFeY IC increase the surface roughness of the IC after the IC sintering step. The full coating is deposited on the Cr alloy interconnect after the pressing and sintering steps.

Figure 3A:
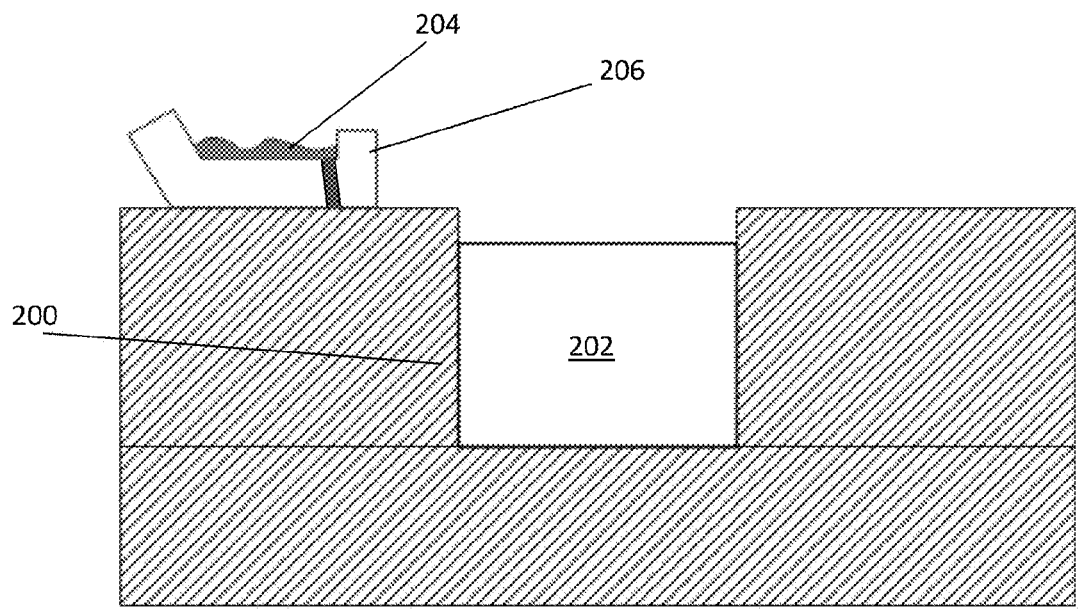
FIGS. 3A-3C are a schematic illustration of steps in a method of making an interconnect according an embodiment.
Figure 3B:
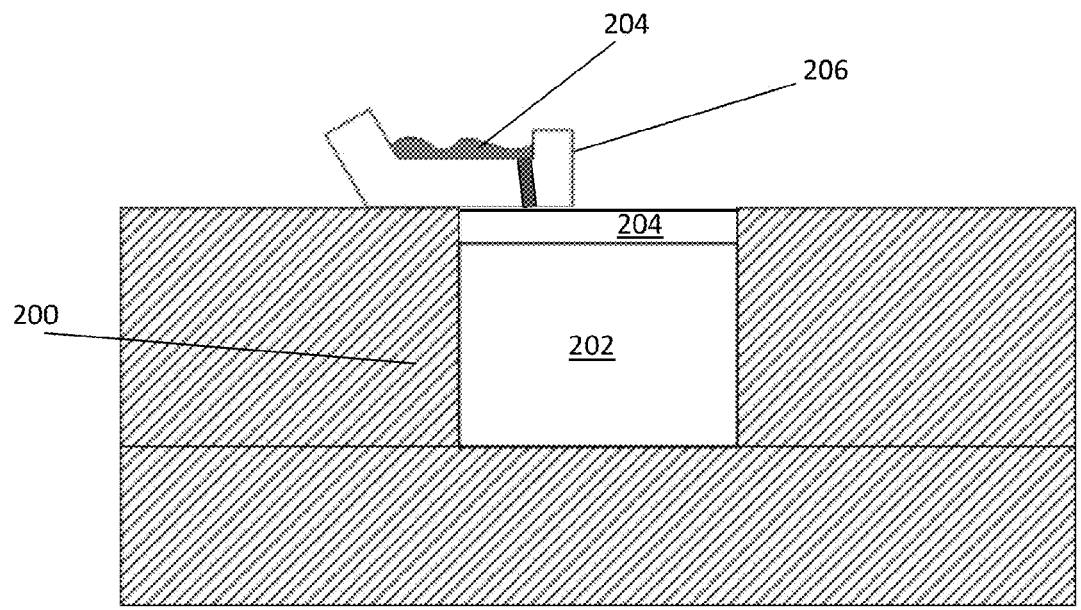
Figure 3C:
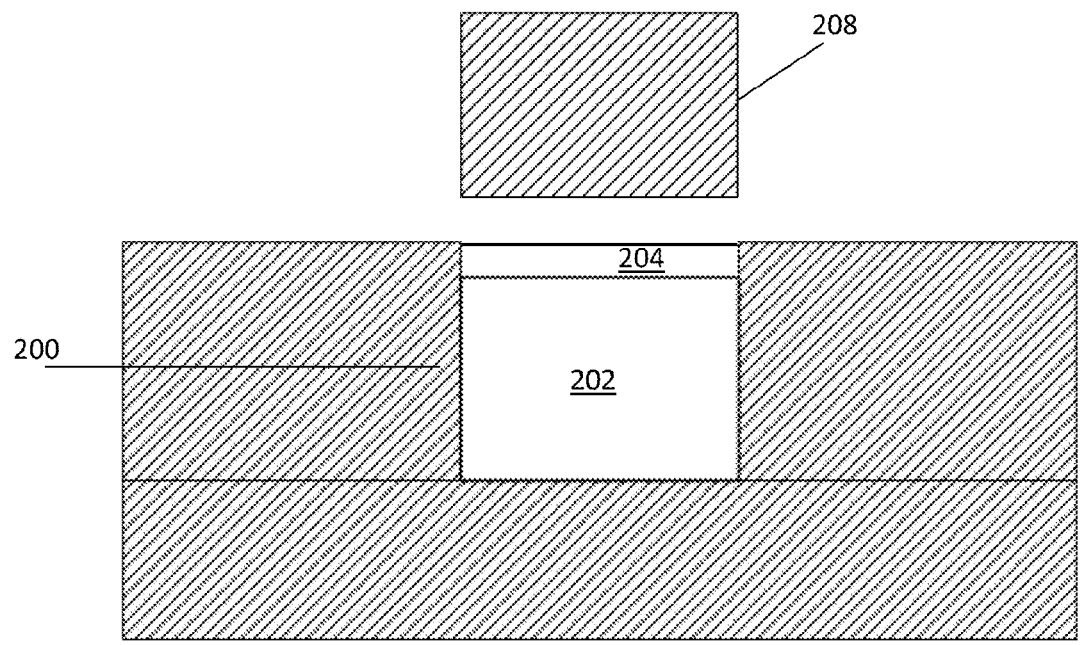

A method for embedding the coating material in the top surface of the interconnect is illustrated in FIGS. 3A-3C. The lubricant and Cr/Fe powder 202 which is used to form the bulk of the IC are added to the mold cavity 200 with a first shoe (not shown) or by another suitable method, as shown in FIG. 3A. The coating material powder 204 (e.g., LSM or MCO) or a mix of the coating material power 204 and lubricant/Cr/Fe powder 202 is provided into the mold cavity using a second shoe 206 over the powder 202 located in the mold cavity before the compaction step, as shown in FIG. 3B. The powders 204, 202 are then compacted using a punch 208, as shown in FIG. 3C, to form the interconnect having the coating material embedded in its surface on the air side (i.e., if the air side of the IC is formed facing up in the mold).

Alternatively, the coating material powder 204 (e.g., LSM or MCO) (or a mix of the coating material power 204 and lubricant/Cr/Fe powder 202) is provided into the mold cavity 200 first. The lubricant/Cr/Fe powder 202 is then provided into the mold cavity 200 over powder 204 before the compaction step if the air side of the IC is formed in the mold facing down. In this manner, the coating material is incorporated into the IC primarily at the top of the air side surface of the IC.

Figure 4:
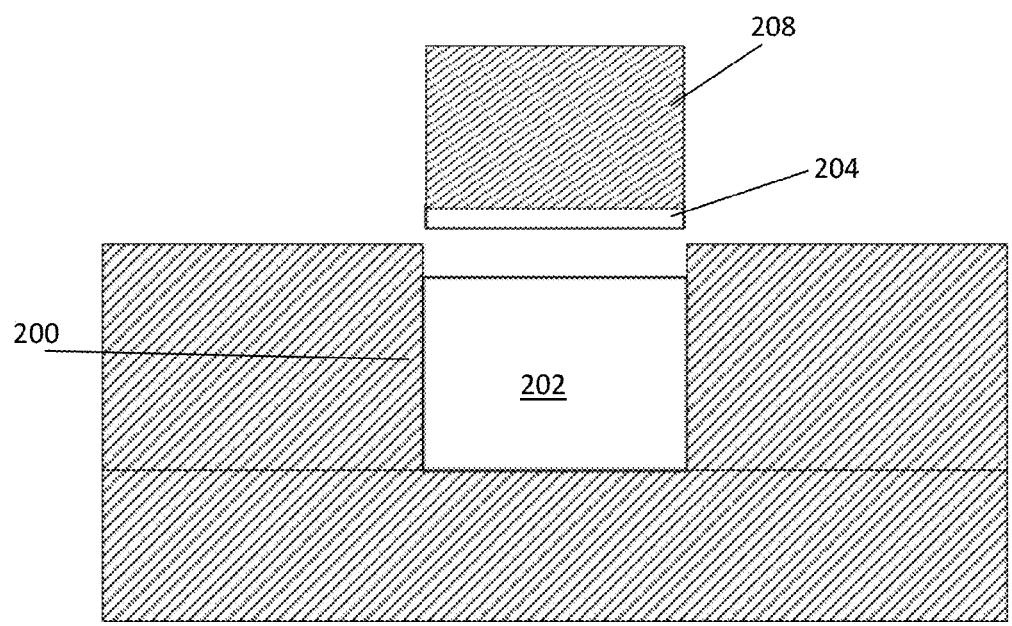
FIG. 4 is another schematic illustration of a method of making an interconnect according an embodiment.

Alternatively, as shown in FIG. 4, the coating powder 204 may be electrostatically attracted to the upper punch 208 of the press. Then, the upper punch 208 presses the coating powder 204 and the lubricant/interconnect powder materials 202 in the mold cavity 200 to form an IC with the coating material 204 embedded in the top of the air side.

Using the above methods, the coating powder may be uniformly incorporated in the surface of the air side of the IC after the compaction step. The compaction step is then followed by sintering and coating steps, such as an MCO and/or LSM coating step by APS or another method described herein.

The ratio of the coating powder and Fe in the Cr—Fe alloy is preferably selected so that the top coating material has a similar coefficient of thermal expansion (CTE) to that of the sintered and oxidized interconnect. The coefficient of thermal expansion of the Cr—Fe alloy is a function of the composition of the alloy and can be chosen by selecting a Cr to Fe ratio. The sintering process may be adjusted to keep the powder oxidized and stable. For example, sintering may be performed using wet hydrogen, or in an inert atmosphere, such as nitrogen, argon or another noble gas. The wet hydrogen or inert gas atmosphere is oxidizing or neutral, respectively, and thereby prevents the oxide powder from reducing.

Figure 6:
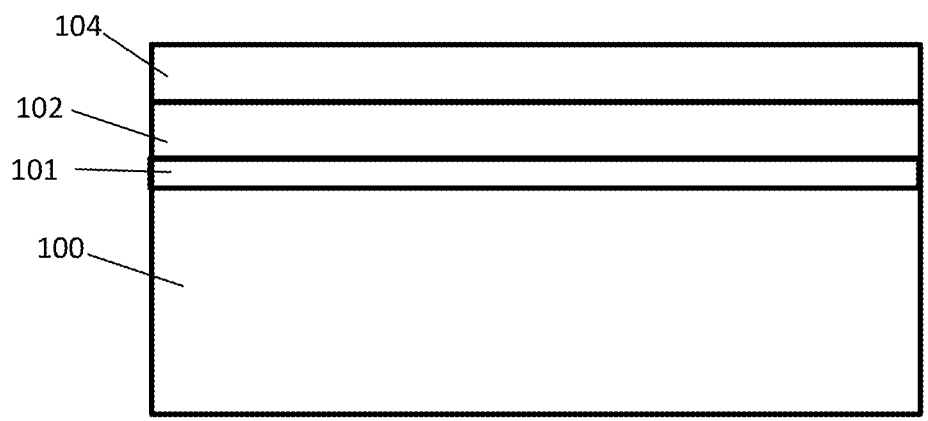
FIG. 6 is a side schematic illustration of an embodiment of an interconnect with a bilayer composite coating.

In fourth embodiment, the coating is a multi-layer composite. FIG. 6 illustrates an example of the fourth embodiment of an IC with a composite coating. The composite coating is composed of a spinel layer 102 and a perovskite layer 104. The spinel layer 102 is deposited first on the Cr alloy (e.g., CrF) interconnect 100. The perovskite layer 104, e.g. the LSM layer described above, is then deposited on top of the spinel layer 102. The native chromium containing interfacial spinel layer 101 may form between the interconnect 100 and layer 102 during layer 102 deposition and/or during high temperature operation of the fuel cell stack containing the interconnect.

Preferably, the lower spinel layer 102 comprises the above described MCO spinel containing Cu and/or Ni. Layer 102 acts as a doping layer that increases the conductivity of the underlying manganese chromium oxide $(Mn, Cr)_3O_4$ or manganese cobalt chromium oxide $(Mn, Co, Cr)_3O_4$ interfacial spinel layer 101. In other words, the Cu and/or Ni from the spinel layer 102 diffuses into the interfacial spinel layer 101 during and/or after formation of layer 101. This results in a Cu and/or Ni doped layer 101 (e.g., (Mn and $Cr)_{3-x-y}Co_x(Cu$ and/or $Ni)_yO_4$ where $(0 \leq x \leq 1)$, $(0 < y < 0.3)$) which lowers layer 101 resistivity.

Layer 102 may comprise the above described Cu containing MCO layer and/or a Ni containing MCO layer and/or a Ni and Cu containing MCO layer. In the MCO layer, when the A element is Mn, the B element is Co, and the spinel is doped with Cu and/or Ni, the spinel family may be described with the general formula $(Mn, Co)_{3-y}(Cu, Ni)_yO_4$, where $(0<y<0.3)$ More specifically, the spinel family may be described with the following formulas depending on location of the Cu and/or Ni alloying elements:

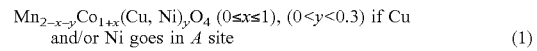

$Mn_{2-x-y}Co_{1+x}(Cu, Ni)_yO_4$ $(0 \leq x \leq 1)$, $(0<y<0.3)$ if Cu and/or Ni goes in $A$ site     (1)

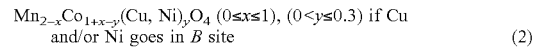

$Mn_{2-x}Co_{1+x-y}(Cu, Ni)_yO_4$ $(0 \leq x \leq 1)$, $(0<y \leq 0.3)$ if Cu and/or Ni goes in $B$ site     (2)

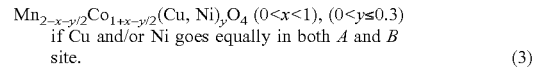

$Mn_{2-x-y/2}Co_{1+x-y/2}(Cu, Ni)_yO_4$ $(0<x<1)$, $(0<y \leq 0.3)$ if Cu and/or Ni goes equally in both $A$ and $B$ site.     (3)

Figure 5:
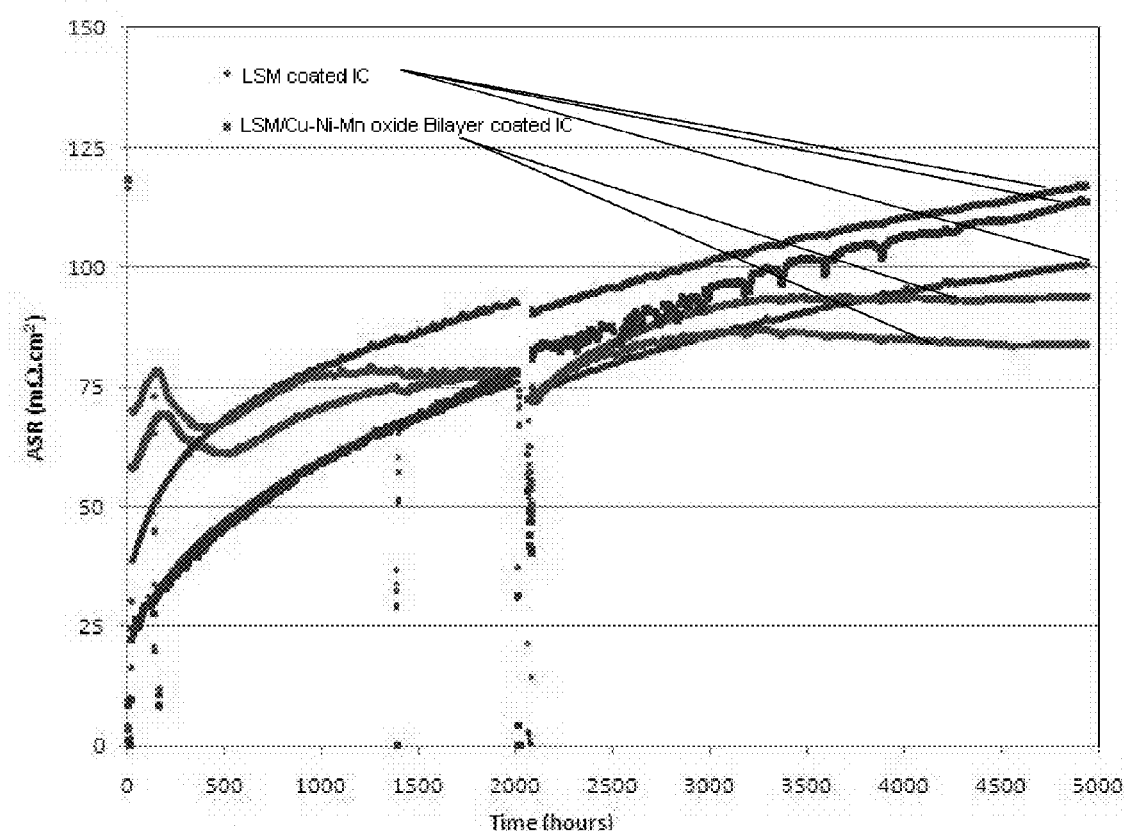
FIG. 5 is a plot illustrating the increase in area specific resistance (ASR) with time of doping coated and undoped coated interconnects.

FIG. 5 illustrates the reduction of area specific resistance (ASR) degradation as a function of time of CrF interconnects coated with a Cu and Ni containing manganese oxide doping layer (e.g., $(Cu,Ni,Mn)_3O_4$ spinel) compared to an interconnect coated with an LSM layer. The interconnects with a doping layer initially start with a higher ASR than the interconnects with the LSM layer coating. However, the rate of increase of ASR for the LSM layer coated ICs is much higher than that of the doping layer coated ICs. Within 1000-2000 hours, the ASR of the LSM layer coated ICs is higher than those with the doping layer coating. Further, after approximately 2500 hours of operation, the ASR of the interconnects with the doping layer stays constant, while the ASR of the LSM layer coated interconnects keeps rising with time.

While the Cu and/or Ni containing spinel doping layer 102 decreases the ASR of the interconnects, it is permeable to both oxygen and chromium. Thus, in the present embodiment, a second perovskite barrier layer 104 is formed over the doping layer 102. Preferably, layer 104 is a dense LSM layer that reduces or prevents Cr and oxygen diffusion. Layer 104 may be formed with the sintering aid described above to increase its density. The dense layer 104 reduces or prevents the growth of the interfacial spinel layer 101 by blocking diffusion of air and oxygen from the fuel cell cathode side to the CrF IC surface during stack operation. Layer 104 also reduces or prevents chromium poisoning of the fuel cell cathodes in the stack by reducing or preventing chromium diffusion from the ICs to the cathodes.

Thus, the composite coating 102/104 reduces or eliminates the area specific resistance (ASR) degradation contribution from interconnects to the stacks and lowers the overall degradation of the fuel cell stack by reducing or eliminating Cr poisoning of the fuel cell cathodes. First, the spinel doping layer 102 dopes the chromium containing interfacial spinel layer 101 with elements (e.g. Ni and/or Cu) that decrease the resistance of the spinel layer 101. Second, the spinel layer 102 prevents direct interaction between the perovskite 104 layer and the Cr containing interfacial spinel layer 101 which can lead to the formation of unwanted and resistive secondary phases. Third, the spinel (e.g. Mn containing spinel having Co, Cu and/or Ni) layer 102 is less prone to cracking than the LSM layer 104, which enhances the integrity of the coating. Fourth, the top perovskite layer 104 is a second barrier layer that decreases the transport of oxygen to the interfacial oxide 101 on the interconnect surface. The top perovskite layer 104 thus reduces the growth rate of the native oxide layer 101, and decreases transport of chromium from layer 101 to the fuel cell cathodes through the doping layer 102.

Figure 7A:
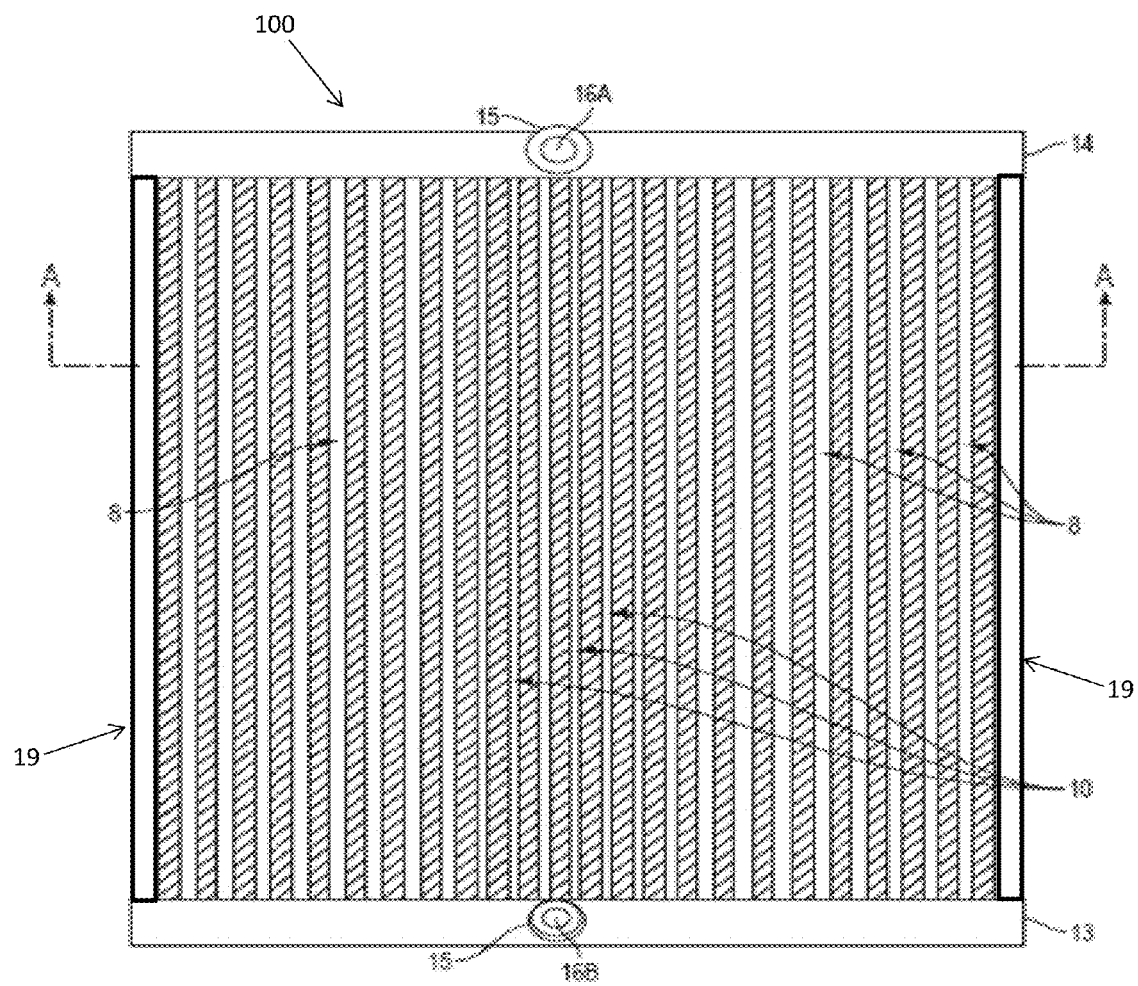
FIGS. 7A-7C are schematic illustrations illustrating: (A) the air side of an interconnect according to an embodiment, (B) a close up view of the seal portion of the air side of the interconnect and (C) the fuel side of the interconnect.

FIG. 7A shows the air side of an exemplary interconnect 100. The interconnect may be used in a stack which is internally manifolded for fuel and externally manifolded for air. The interconnect contains air flow passages or channels 8 between ribs 10 to allow air to flow from one side 13 to the opposite side 14 of the interconnect. Ring (e.g. toroidal) seals 15 are located around fuel inlet and outlet openings 16A, 16B (i.e., through holes 16A, 16B in interconnect 100). Strip seals 19 are located on lateral sides of the interconnect 100.

Figure 7B:
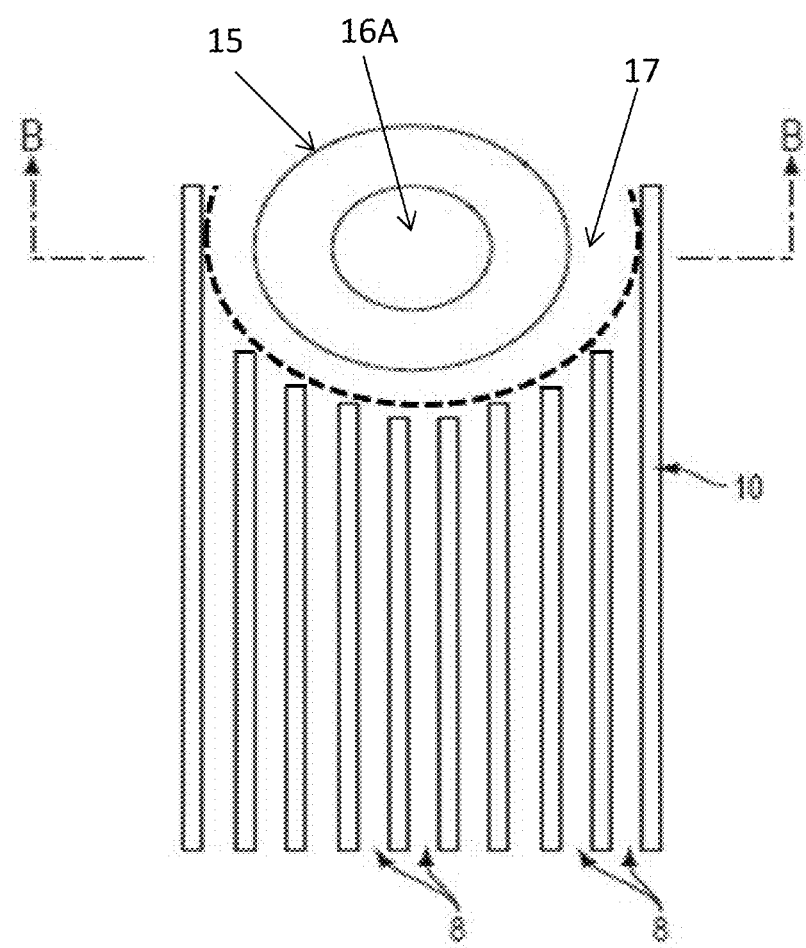

FIG. 7B shows a close up view of an exemplary seal 15, passages 8 and ribs 10. The seals 15 may comprise any suitable seal glass or glass ceramic material, such as borosilicate glass. Alternatively, the seals 15 may comprise a glass ceramic material described in U.S. application Ser. No. 12/292,078 filed on Nov. 12, 2008, incorporated herein by reference.

The interconnect 100 may contain an upraised or boss region below the seal 15 if desired. Additionally, as illustrated in FIG. 7B, the seal 15 is preferably located in a flat region 17 of the interconnect 100. That is, the seal 15 is located in a portion of the interconnect that does not include ribs 10. If desired, the interconnect 100 may be configured for a stack which is internally manifolded for both air and fuel. In this case, the interconnect 100 and the corresponding fuel cell electrolyte would also contain additional air inlet and outlet openings (not shown).

Figure 7C:
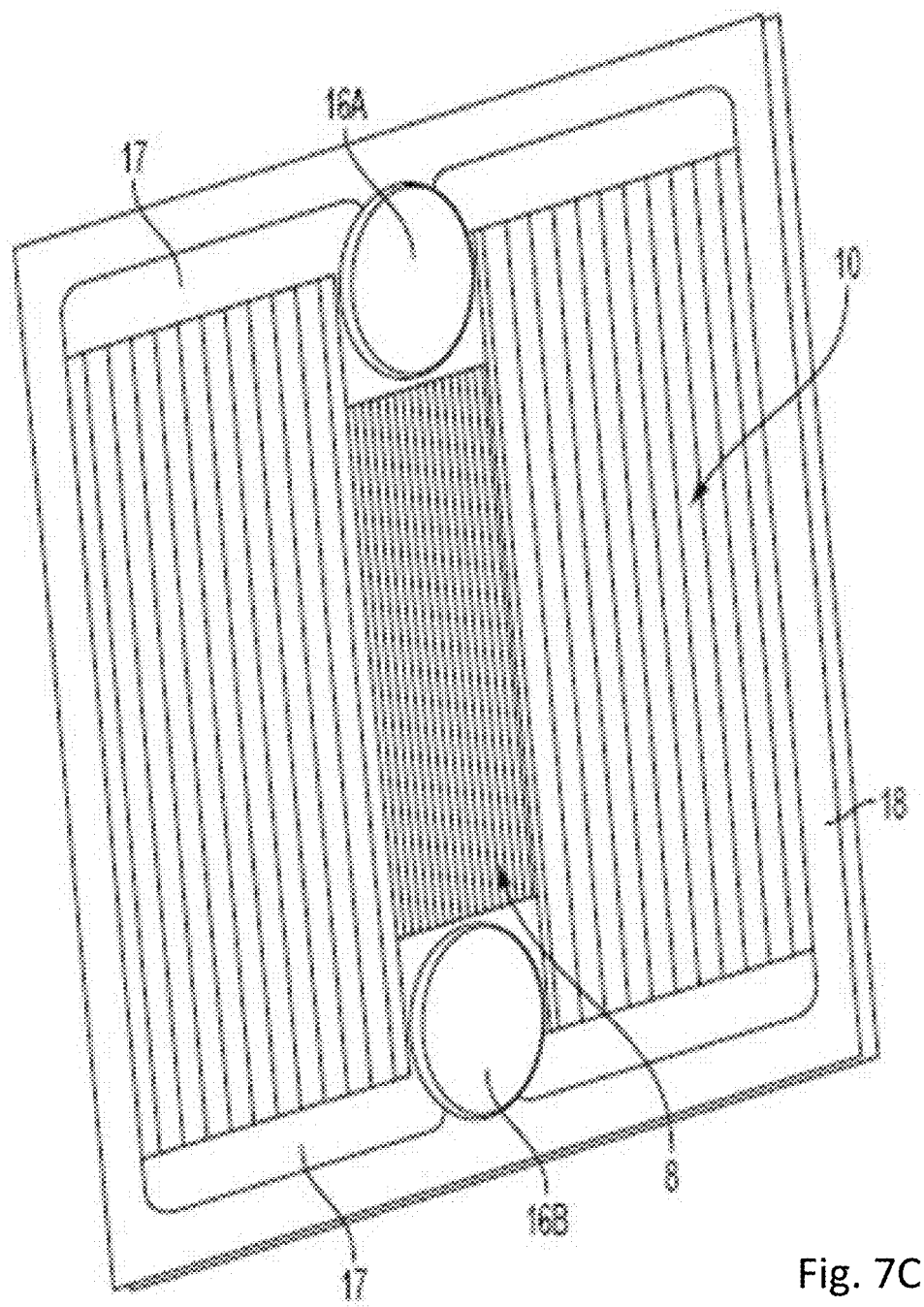

FIG. 7C illustrates the fuel side of the interconnect 100. A window seal 18 is located on the periphery of the interconnect 100. Also shown are fuel distribution plenums 17 and fuel flow passages 8 between ribs 10. It is important to note that the interconnect 100 shown in FIG. 7C has two types of fuel flow passages; however, this is not a limitation of the present invention. The fuel side of an interconnect 100 may have fuel flow passages that are all the same depth and length, or a combination of short and long, and/or deep and shallow passages.

In an embodiment, the interconnect 100 is coated with the $Mn_{1.5}Co_{1.5}O_4$ (MCO) spinel at room temperature using an aerosol spray coating method and further processed with one or more heat treatments. Generally, the MCO coating is omitted in the seal regions (toroid 15, strip 19) by masking or removing MCO deposited in these regions.

The MCO coating may be reduced by the fuel in the riser hole and then reacts with the glass sealing materials at the toroid-shaped seal 15. Thus, in an embodiment, for the interconnect 100 shown in FIG. 7B, the MCO coating is removed from the flat region 17 (e.g., by grit blasting) on the air side of the interconnect before stack assembly and testing. Alternatively, the flat region 17 may be masked during aerosol deposition to prevent coating of the flat region 17. Thus, the MCO coating is omitted in the region 17 under the toroidal seal 15 adjacent to the fuel inlet and/r outlet openings 16A, 16B.

In another embodiment, the interconnect 100 is manufactured by a powder metallurgy process. The powder metallurgy process may result in parts that have connected porosity within the bulk of the interconnect 100 that allows fuel to diffuse from the fuel side to the air side. This fuel transported via the pores may to react with the MCO coating on the air side at the coating/interconnect interface. This reaction may lead to seal failure and stack separation. In an embodiment, this failure may be mitigated by omitting the MCO coating under the strip seal 19 by masking the seal 19 locations on the edges of the interconnect during MCO deposition, thereby eliminating coating in these seal areas and allowing the glass seals 19 to bond directly to the metallic interconnect.

Figure 8:
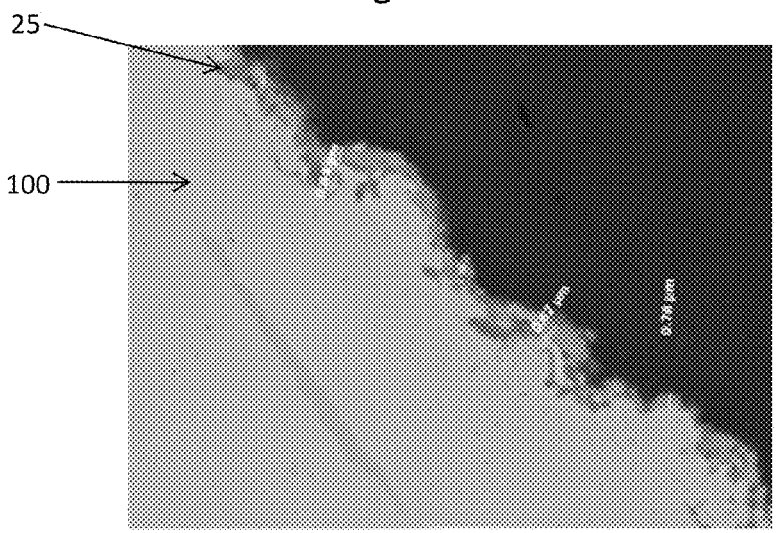
FIG. 8 is a micrograph illustrating chromium oxide on a fuel side (uncoated side) of interconnect after a reduction sintering step.

In another embodiment, interconnects 100 form a thin, green colored $Cr_2O_3$ oxide layer 25 on the fuel side of the interconnect 100. A cross-sectional micrograph of this fuel side oxide is illustrated in FIG. 8. The $Cr_2O_3$ oxide thickness was found to be between 0.5 to 2 microns. Three methods described below may be used to convert or remove this undesirable chromium oxide layer.

In a first embodiment of the method, this oxide layer is removed by any suitable method, such as grit blasting. This method is effective. However, this method is time consuming and adds processing costs.

Alternatively, the $Cr_2O_3$ oxide layer 25 may be left in place and converted to a composite layer. In this embodiment, a nickel mesh anode contact is deposited on the $Cr_2O_3$ oxide layer 25 and allowed to diffuse into the chromium oxide layer. The nickel reacts with the $Cr_2O_3$ oxide layer 25 and forms a Ni-metal/$Cr_2O_3$ composite layer that reduces ohmic resistance of layer 25. If desired, the mesh may be heated after contacting layer 25 to expedite the composite formation.

In another embodiment, oxide layer 25 is reduced or completely eliminated by firing the MCO coated interconnect in an ambient having a low oxygen partial pressure. For instance, based on thermodynamics, $Cr_2O_3$ can be reduced to Cr metal at a $pO_2$ (partial pressure) of $10^{-24}$ atm at 900° C., while CoO reduces to Co-metal at a $pO_2$ of $10^{-16}$ atm at 900° C. By lowering the partial pressure of oxygen (i.e., lowering the dew point) of the firing atmosphere to less than $10^{-24}$ atm at 900° C., the formation of the $Cr_2O_3$ oxide on the fuel side (uncoated side) may be prevented, while allowing the reduction of the MCO coating on the air side of the interconnect to MnO (or Mn metal if $pO_2<10^{-27}$ atm) and Co-metal for sintering benefits. At $pO_2<10^{-27}$ atm, MCO would be reduced to both Mn-metal and Co-metal which may lead to better sintering and denser coatings as compared with MnO/Co-metal. In general, the MCO coated interconnect may be annealed at T>850° C., such as 900° C. to 1200° C., at $pO_2$ of $10^{-24}$ atm, e.g. $10^{-25}$ atm to $10^{-30}$ atm, including $10^{-27}$ atm to $10^{-30}$ atm for 30 minutes to 40 hours, such as 2-10 hours.

In another embodiment, to reduce costs of the MCO coating process, the MCO coating may be annealed (e.g. fired or sintered) during the sintering step for the powder metallurgy (PM) formed interconnect. The sintering of the powder metallurgy interconnect 100 and of the MCO coating on the interconnect may be conducted in the same step in a reducing ambient, such as a hydrogen reduction furnace with a dew point between −20 and −30° C., at temperatures between 1300 and 1400° C., and for a duration between 0.5 and 6 hrs. At these temperatures and partial pressures of oxygen, the MCO coating will reduce completely to Co-metal and Mn-metal. However, the melting temperature of Mn is around 1245° C., the melting temperature of Co is around 1495° C., and the Co—Mn system has a depressed liquidus line. Thus, sintering at temperatures between 1300 and 1400° C. may result in the formation of an undesirable liquid phase.

Possible solutions to avoid the formation of liquid include lowering the sintering temperature below 1300° C., such as below 1245° C., for example from 1100° C. to 1245° C., increasing the partial pressure of oxygen to reduce the Mn (but not oxidize the Cr) in MCO to MnO (melting temp 1650° C.) as opposed to Mn-metal, decreasing the Mn:Co ratio in MCO to increase the melting temperature of the Mn—Co metal system, adding dopants to MCO, such as Cr, to increase melting temperature of Co—Mn—Cr metal system, and/or adding dopants, such as Fe, V and or Ti to the MCO coating to stabilize binary and ternary oxides (to prevent reduction to metal phase). For example, at a sintering temperature of 1400° C., MnO reduces to Mn-metal at a $pO_2$ of $10^{-17}$ atm while $Cr_2O_3$ reduces to Cr-metal at a $pO_2$ of $10^{-15}$ atm, which gives a small window (a $pO_2$ between $10^{-17}$ and $10^{-15}$ atm) where Cr is reduced to metal yet the MnO stays as an oxide which has a high melting point. Thus, the interconnect and the MCO coating may be sintered at 1300-1400° C. at $pO_2=10^{-15}$-$10^{-17}$ atm.

In another embodiment, the IC sintering step could be conducted first after which the MCO coating is applied to the sintered IC. The IC and coating are then put through a reduction step described in the previous embodiment that is more suitable for the MCO coating.

In another embodiment, interconnect fabrication costs may be reduced by depositing the MCO layer as a mixture of already reduced components such as MnO, CoO, Mn metal, Co metal, or any combination of these constituents. The mixture is then to be sintered, preferably under low $pO_2$ conditions. However, such sintering may be easier or the starting material may be denser, thereby reducing the time for sintering. Additionally, these precursor particles may be much less expensive than MCO precursor, which requires expensive synthesis methods to produce.

Additionally, a grit blast step may be performed before coating the interconnect with the MCO layer to remove the native chromium oxide layer from both the air and fuel sides of the interconnect. To reduce costs, the native oxide may be removed only from the air side of the interconnect before forming the MCO coating on the air side of the interconnect. The MCO coating is then deposited on the air side and the interconnect is anneals as described above. Removal of oxide from the fuel side, such as by grit blasting, may then take place after the anneal is complete. In this manner, the number of grit blast steps is reduced because no additional grit-blast steps are required to remove the oxide growth that occurs on the fuel side of the interconnect during the anneal of the MCO coating.

In other embodiments, the composition of MCO coating is modified to increase stability at SOFC operational temperatures, such as 800-1000° C. The MCO composition of some of the prior embodiments is $Mn_{1.5}Co_{1.5}O_4$. This material has a high electric conductivity. However, the MCO material is reducible to the binary oxides, MnO and CoO, or to the binary oxide MnO and Co-metal.

Figure 9:
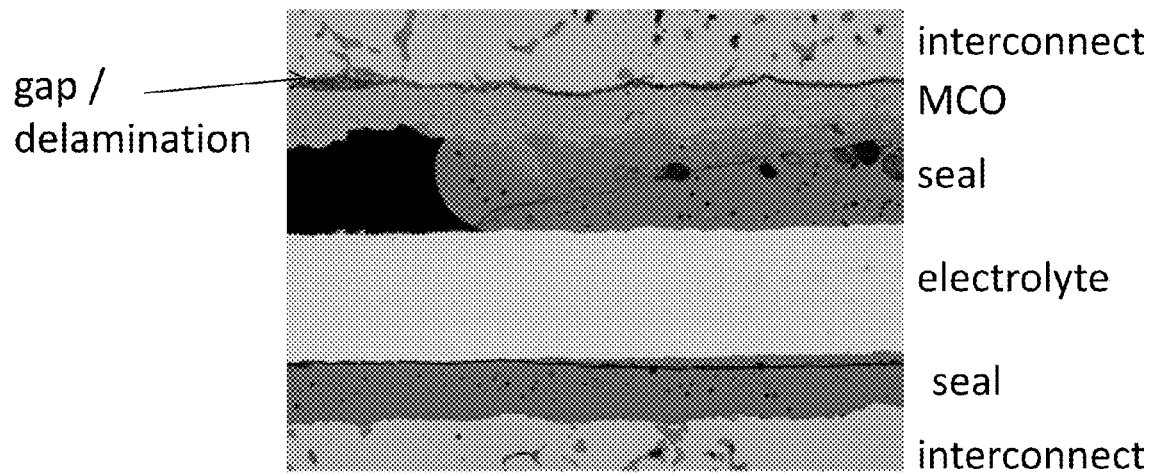
FIG. 9 is a micrograph of a portion of a SOFC stack illustrating reduction of an MCO coating (in a strip seal area) at the coating/IC interface due to fuel diffusing through porous IC.

In some fuel cell geometries, the MCO coating is only directly exposed to the fuel stream at the riser opening(s) 16A, 16B. This fuel/coating interface can be eliminated by not coating the flat region 17 around the opening (FIG. 7B). However, interconnects which are fabricated by a powder metallurgy method results in a part with some connected (open) porosity that can allow fuel to diffuse through the part to the air side. The fuel that diffuses through the pores may react with and reduce the MCO at the MCO/interconnect interface (shown in FIG. 9) resulting in a porous layer consisting of MnO and Co-metal. The coating/IC interface may be compromised, leading to adhesive failure and separation of the cell from the interconnect during routine handling, as shown in FIG. 9.

It is desirable to have a coating material that is more stable and less likely to be reduced when exposed to a fuel environment. The embodiments described below optimize the composition and/or dope the MCO with other elements in order to stabilize the material in a reducing atmosphere.

Figure 11:
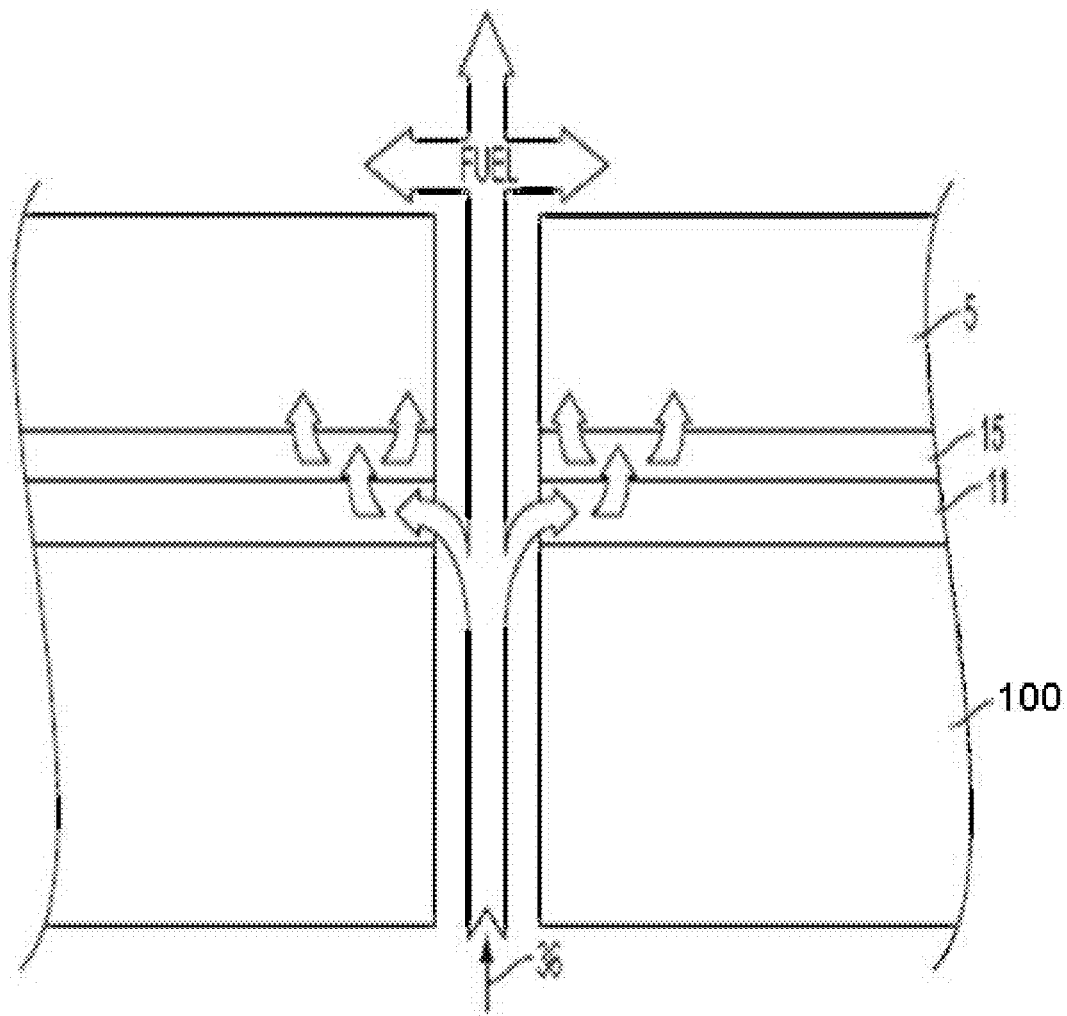
FIG. 11 is a schematic illustration of a fuel inlet riser in a conventional fuel cell stack.
Figure 12:
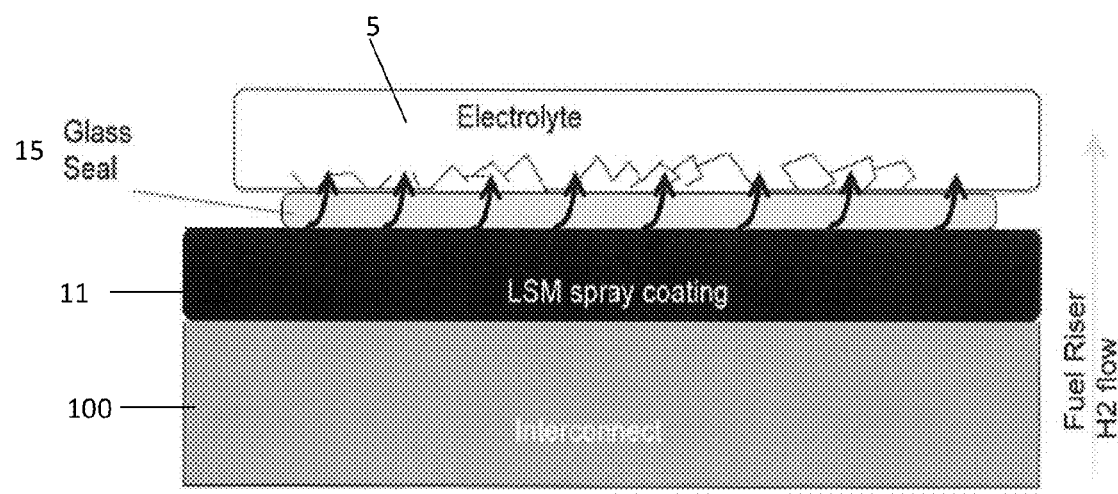
FIG. 12 is a schematic illustration of a SOFC illustrating a theory of electrolyte corrosion.

FIGS. 11 and 12 illustrate a theory of electrolyte corrosion. In the prior art SOFC stack shown in FIGS. 11 and 12, LSM coating 11 on an interconnect is located in contact with the ring seal 15. The seal 15 contacts the cell electrolyte 5. Without wishing to be bound by a particular theory, it is believed that manganese and/or cobalt from the manganese and/or cobalt containing metal oxide (e.g., LSM of LSCo) layer 11 leaches into and/or reacts with the glass seal 15 and is then transported from the glass to the electrolyte. The manganese and/or cobalt may be transported from the glass to the electrolyte as manganese and/or cobalt atoms or ions or as a manganese and/or cobalt containing compound, such as a manganese and/or cobalt rich silicate compound. For example, it is believed that manganese and cobalt react with the glass to form a $(Si, Ba)(Mn,Co)O_{6\pm\delta}$ mobile phase which is transported from the glass seal to the electrolyte. The manganese and/or cobalt (e.g., as part of the mobile phase) at or in the electrolyte 5 tends to collect at the grain boundaries of the zirconia based electrolyte. This results in intergranular corrosion and pits which weaken the electrolyte grain boundaries, ultimately leading to cracks (e.g., opening 16A to opening 16B cracks) in the electrolyte 5. Without being bound by a particular theory, it is also possible that the fuel (e.g., natural gas, hydrogen and/or carbon monoxide) passing through the fuel inlet riser 36 may also react with the metal oxide layer 11 and/or the glass seal 15 to create the mobile phase and to enhance manganese and/or cobalt leaching from layer 11 into the seal 15, as shown in FIG. 11.

As discussed above, in other embodiments, the composition of MCO coating is modified to increase stability at SOFC operational temperatures, such as 800-1000° C. Thus, the MCO composition may be optimized based on stability and electrical conductivity. Example compositions include, but are not limited to, $Mn_2CoO_4$, $Mn_{1.75}Co_{0.25}O_4$, $Co_{1.75}Mn_{0.25}O_4$, $Co_2MnO_4$, and $Co_{2.5}Mn_{0.5}O_4$.

Figure 10:
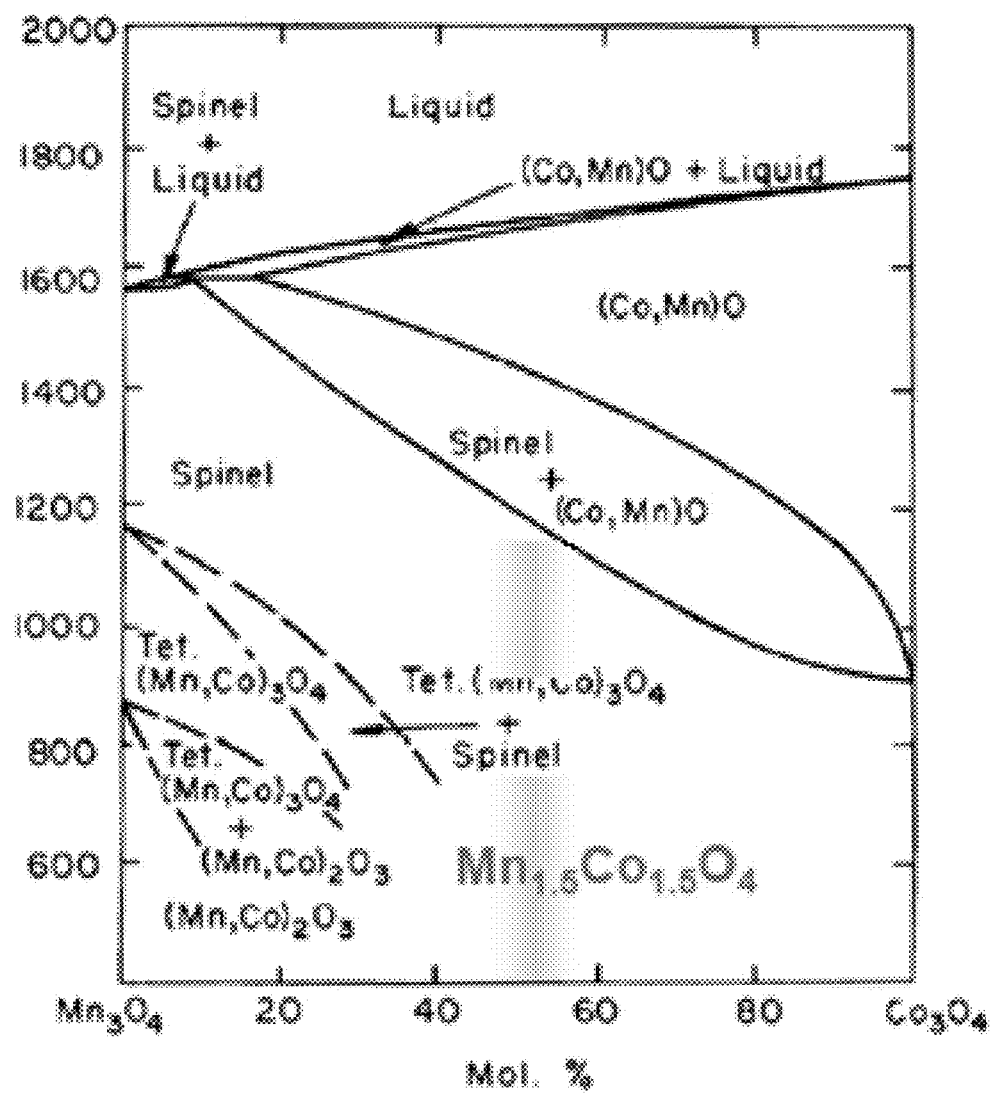
FIG. 10 is a phase diagram illustrating the $Mn_3O_4$—$Co_3O_4$ system.

Based on the phase diagram (FIG. 10) and from a stability point of view, it may be beneficial to have a multi-phased composition rich in Mn such as $Mn_{2.5}Co_{0.5}O_4$ and $Mn_{2.75}Co_{0.25}O_4$ (e.g. Mn:Co atomic ration of 5:1 or greater, such as 5:1 10 11:1. A higher Mn content may also result in a more stable composition because the composition is in a higher oxidation state than the two phase spinel+binary oxide found at high Co content. However, any composition in the $(Mn,Co)_3O_4$ family between the end compositions of $Co_3O_4$ and $Mn_3O_4$ may be suitable.

In another embodiment, MCO is stabilized by adding an additional dopant that is less prone to reduction. For example, it is known that MCO reacts with Cr in the IC alloys to form $(Cr, Co, Mn)_3O_4$ spinel. If Cr is added intentionally to the MCO coating in low levels, such as 0.1 atomic % to 10%, this would result in a spinel $(Cr, Co, Mn)_3O_4$ which is more stable than MCO because $Cr^{3+}$ is very stable. Other transition metal elements that are soluble in the spinel structure which may increase stability include Fe, V, and Ti. Example coating materials include the spinel $(Fe, Co, Mn)_3O_4$ with 1% to 50 at % Fe, $(Ti, Co, Mn)_3O_4$ with 1% to 50% Ti, or a combination of $(Fe, Ti, Co, Mn)_3O_4$.

The addition of Ti may lead to more stable secondary phases including $Co_2TiO_4$, $MnTi_2O_4$, or $FeTi_2O_4$. These phases benefit overall coating stability. Spinels with any combination of the above mentioned dopants are possible including (Fe, Cr, Co, Mn)$_3$O$_4$, (Cr, Ti, Co, Mn)$_3$O$_4$, etc.

It is known that spinels based on Mg, Ca, and Al are very stable and resist reduction. However, these spinels have low electrical conductivity and thus are not preferred for application as an interconnect coating. In contrast, low levels of doping of Ca, Mg, and/or Al into a conductive spinel, such as MCO, increases the stability of the material while only marginally lowering the electrical conductivity. Example spinels include (Ca, Co, Mn)$_3$O$_4$ with 1% to 10 at % Ca, (Mg, Co, Mn)$_3$O$_4$ with 1% to 10 at % Mg, (Al, Co, Mn)$_3$O$_4$ with 1% to 10 at % Al, or combinations such as (Ca, Al, Mn, Co)$_3$O$_4$, where Ca, Al and/or Mg are added at 1-10 at %. Si and Ce are other elements that may be use as dopants (1-10 at %) for the MCO spinel.

In addition to the methods described above that fall in the general category of material-specific stabilization efforts, alternative embodiments are drawn to design changes that can be made that improve the stability of the coating, either in combination with or in the alternative to the above embodiments. In a first alternative embodiment, a stable barrier layer can be added to the interconnect before the addition of the MCO coating. This barrier layer would preferably be made of a more stable oxide than MCO and would be conductive and thin enough to not detrimentally affect the conductivity of the interconnect component. Further, this barrier layer is preferably dense and hermetic. Example barrier layers include, but are not limited to, a doped Ti-oxide (e.g. TiO$_2$) layer or lanthanum strontium manganate (LSM).

A second alternative embodiment includes the addition of a reactive barrier layer between the interconnect and the MCO coating which includes any of the elements discussed above (e.g. Cr, V, Fe, Ti, Al, Mg, Si, Ce and/or Ca) as possible dopants. This layer diffuses these element(s) into the MCO coating upon heating the interconnect to standard operating temperatures (800-1000° C.), creating a graded doping profile with higher concentration of dopant at the interconnect interface where reduction occurs. In this manner, a majority of the coating contains relatively little dopant and hence the conductivity may be less affected than by a uniform doping of the coating material. A reactive layer is a metal layer (e.g. Ti or metal containing compound that allows outdiffusion of the metal at 800 ° C. or higher.

A third embodiment includes designing the interconnect material to contain a reactive doping element (e.g. Si, Ce, Mg, Ca, Ti and/or Al for a Cr-4-6% Fe interconnect) that diffuses into the MCO coating in the same manner just described. Thus, the interconnect would contain ≥90 wt % Cr, 4-6% Fe and 0.1-2% Mg, Ti, Ca and/or Al.

Additionally, any method of deposition or treatment of the IC to reduce or close the porosity of the part, beyond the standard oxidation methods, would help limit the reduction of the MCO coating. For example, a Cr layer may be electroplated onto the porous part before the MCO annealing step to further reduce the porosity. Or, as described above, the addition of a reactive barrier layer, if dense and hermetic, would also reduce or block hydrogen diffusion from surface pores.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of making an interconnect for a solid oxide fuel cell stack, comprising:
   providing first metallic powder particles comprising Cr and Fe in a mold cavity;
   providing second powder particles comprising one or more of Sr, La, Mn and Co oxides in the mold cavity;
   compacting the first and second powder particles in the same compacting step to form the interconnect; and
   coating at least one surface of the interconnect with a protective coating after the step of compacting.

2. The method of claim 1, wherein the first and second powder particles are mixed together to form a powder mixture prior to being provided to the mold cavity as the powder mixture.

3. The method of claim 2, further comprising adding a lubricant to the powder mixture prior to the step of compacting.

4. The method of claim 3, wherein the interconnect has at least one of Sr, La, Mn and Co oxide regions throughout its thickness.

5. The method of claim 1, wherein the first powder particles are provided in the mold cavity first and the second powder particles provided on top of the first powder particles in the mold cavity and wherein the compacting results in lanthanum strontium manganate (LSM) or manganese cobalt oxide (MCO) regions on a top surface of a Cr—Fe alloy interconnect.

6. The method of claim 1, wherein the second powder particles are provided in the mold cavity first and the first powder particles provided on top of the second powder particles in the mold cavity and wherein the compacting results in lanthanum strontium manganate (LSM) or manganese cobalt oxide (MCO) regions on a bottom surface of a Cr—Fe alloy interconnect.

7. The method of claim 1, wherein:
   the first powder particles are provided to the mold first and the second powder particles are electrostatically attracted to a bottom surface of a punch used to compact the powder particles; and
   the punch presses the second powder onto the first powder to compact the first and the second power particles to form a Cr—Fe alloy interconnect with lanthanum strontium manganate (LSM) or manganese cobalt oxide (MCO) regions on a top surface of the interconnect.

8. The method of claim 1, wherein a surface area of the interconnect is increased relative to an interconnect made only by compacting the first powder particles in the same mold cavity.

9. The method of claim 1, wherein the first powder particles comprise a mixture of elemental Cr and elemental Fe particles or Cr—Fe alloy powder particles.

10. The method of claim 1, wherein the second powder particles comprise lanthanum strontium manganate (LSM) or manganese cobalt oxide (MCO) powder particles.

11. The method of claim 1, wherein the first and second powder particles are compacted to form the interconnect having one or more of Sr, La, Mn and Co oxide regions on at least a first surface of the interconnect, and the protective coating is formed on at least the first surface of the interconnect.

12. The method of claim 1, wherein the second powder particles form depth penetrations of the protective coating into the interior of the interconnect.

13. The method of claim 1, further comprising sintering the interconnect after the step of compacting and before the step of coating.

* * * * *